United States Patent
Sudo et al.

(10) Patent No.: US 8,711,219 B2
(45) Date of Patent: Apr. 29, 2014

(54) SIGNAL PROCESSOR AND SIGNAL PROCESSING METHOD

(75) Inventors: Takashi Sudo, Fuchu (JP); Takehiko Isaka, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 293 days.

(21) Appl. No.: 13/332,198

(22) Filed: Dec. 20, 2011

(65) Prior Publication Data

US 2012/0249785 A1 Oct. 4, 2012

(30) Foreign Application Priority Data

Mar. 31, 2011 (JP) ................................. 2011-080786

(51) Int. Cl.
*H04N 7/18* (2006.01)

(52) U.S. Cl.
USPC ............................................ 348/143; 381/80

(58) Field of Classification Search
USPC ................................ 348/143; 381/80; 386/338
See application file for complete search history.

(56) References Cited

U.S. PATENT DOCUMENTS

2010/0208911 A1* 8/2010 Maeda et al. ................. 381/73.1

FOREIGN PATENT DOCUMENTS

| JP | 2006-340151 A | 12/2006 |
|---|---|---|
| JP | 2010-028653 A | 2/2010 |
| JP | 2010-221945 A | 10/2010 |

* cited by examiner

*Primary Examiner* — Huy T Nguyen
(74) *Attorney, Agent, or Firm* — Knobbe, Martens, Olson & Bear, LLP

(57) ABSTRACT

According to one embodiment, a signal processor includes: a plurality of loudspeakers configured to reproduce sound of a plurality of channels; a plurality of microphones configured to pick up sound of a plurality of channels; a detector configured to detect a user who is present in a direction of a space from which the microphones pick up the sound, and output directional characteristic information indicating a relative direction of the user to the loudspeakers; and a signal processor configured to switch contents of processing to reduce a disturbance signal included in a picked-up sound signal of the sound picked up by the microphones from the picked-up sound signal based on the relative direction indicated by the directional characteristic information.

14 Claims, 13 Drawing Sheets

SIGNAL PROCESSOR AND SIGNAL PROCESSING METHOD

CROSS-REFERENCE TO RELATED APPLICATIONS

This application is based upon and claims the benefit of priority from Japanese Patent Application No. 2011-080786, filed Mar. 31, 2011, the entire contents of which are incorporated herein by reference.

FIELD

An embodiment described herein relates generally to a signal processor and a signal processing method.

BACKGROUND

Conventionally, disturbance signals such as noise components and echo components included in an acoustic signal have been reduced by using a digital signal processor (DSP), for example. In the DSP, a noise canceller and an echo canceller change characteristics of the acoustic signal to reduce such disturbance signals. A technique using a plurality of microphones (a microphone array) has been proposed for reducing disturbance signals such as noise components and echo components included in a picked-up sound signal obtained by the microphone array and outputting the resulting signal as an output signal. For picking up sound by using a plurality of microphones, a technique (an utterer tracking microphone array) has also been proposed in which directivity of the microphones is directed toward a user who utters, and disturbance signals such as noise components are reduced by adaptively changing the directivity.

When the utterer tracking microphone array for picking up sound and a plurality of loudspeakers for outputting acoustic signals are used together, the directivity for picking up sound changes as a user moves in a space to which the acoustic signals are output. As a result, loudspeakers causing an echo are shifted according to the location of the utterer. The conventional technique, however, cannot effectively reduce the disturbance signals generated in relation to the location of the user because a relative direction (relative position) between the user and the loudspeakers is not taken into consideration to reduce the disturbance signals.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a signal processor comprises a plurality of loudspeakers, a plurality of microphones, a detector, and a signal processor. The plurality of loudspeakers is configured to reproduce sound of a plurality of channels. The plurality of microphones is configured to pick up sound of a plurality of channels. The detector is configured to detect a user who is present in a direction of a space from which the microphones pickup the sound, and output directional characteristic information indicating a relative direction of the user to the loudspeakers. The signal processor is configured to switch contents of processing to reduce a disturbance signal included in a picked-up sound signal of the sound picked up by the microphones from the picked-up sound signal based on the relative direction indicated by the directional characteristic information.

A signal processor and a signal processing method according to an embodiment will now be explained in detail with reference to the drawings.

Figure 1:
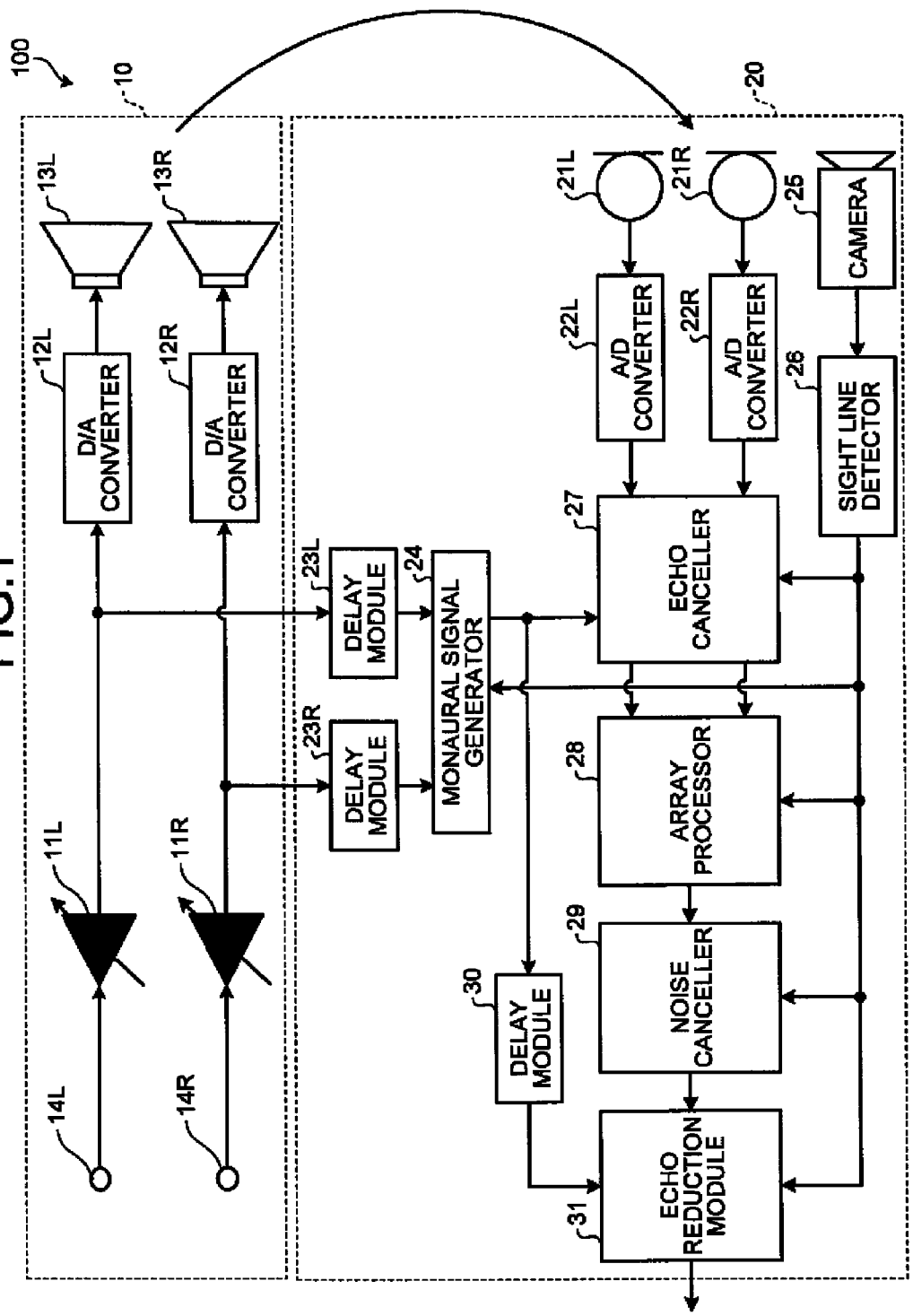
FIG. 1 is an exemplary block diagram of a structure of a signal processor according to an embodiment.

FIG. 1 is a block diagram of a structure of a signal processor according to an embodiment. As illustrated in FIG. 1, a signal processor 100 comprises an acoustic output module 10 and a signal processor 20.

The acoustic output module 10 comprises volume modules 11L and 11R, digital-to-analog (D/A) converters 12L and 12R, and loudspeakers 13L and 13R.

The volume module 11L regulates a volume of an acoustic signal for a left channel (hereinafter referred to as an Lch) received from an input terminal 14L based on an operation amount of a volume adjustment switch (not illustrated). The volume module 11R regulates a volume of an acoustic signal for a right channel (hereinafter referred to as an Rch) received from an input terminal 14R based on an operation amount of a volume adjustment switch (not illustrated).

The D/A converter 12L converts a digital acoustic signal whose volume has been regulated by the volume module 11L into an analog signal, and outputs the analog signal to the loudspeaker 13L. The D/A converter 12R converts a digital acoustic signal whose volume has been regulated by the volume module 11R into an analog signal, and outputs the analog signal to the loudspeaker 13R.

The loudspeakers 13L and 13R form a stereo loudspeaker system, and output sound (reproduced sound) in a space in which the signal processor 100 is disposed. The loudspeaker 13L converts the analog signal received from the D/A converter 12L into a physical vibration, and outputs a sound (reproduced sound). The loudspeaker 13R converts the analog signal received from the D/A converter 12R into a physical vibration, and outputs a sound (reproduced sound).

The signal processor 20 comprises microphones 21L and 21R, analog-to-digital (A/D) converters 22L and 22R, delay modules 23L and 23R, a monaural signal generator 24, a camera 25, a sight line detector 26, an echo canceller 27, an array processor 28, a noise canceller 29, a delay module 30, and an echo reduction module 31.

The microphones 21L and 21R form a stereo microphone system, and pick up sound traveling in the space in which the signal processor 100 is disposed. The microphone 21L outputs a picked-up sound to the A/D converter 22L as an analog picked-up sound signal (hereinafter referred to as an Lch picked-up sound signal). The microphone 21R outputs a picked-up sound to the A/D converter 22R as an analog picked-up sound signal (hereinafter referred to as an Rch picked-up sound signal).

The A/D converter 22L converts the Lch picked-up sound signal picked up by the microphone 21L into a digital signal, and outputs the digital signal to the echo canceller 27. The A/D converter 22R converts the Rch picked-up sound signal picked up by the microphone 21R into a digital signal, and outputs the digital signal to the echo canceller 27.

The delay modules 23L and 23R are delay circuits, for example. The delay module 23L delays, for a predetermined period of time, the digital acoustic signal whose volume has been regulated by the volume module 11L, and outputs the delayed signal to the monaural signal generator 24. The delay module 23R delays, for a predetermined period of time, the digital acoustic signal whose volume has been regulated by the volume module 11R, and outputs the delayed signal to the monaural signal generator 24.

The monaural signal generator 24 calculates a linear sum of the acoustic signal received from the delay module 23L and the acoustic signal received from the delay module 23R based on formula (I), and outputs a signal that is the result of the calculation to the echo canceller 27 and the delay module 30.

$$\alpha \cdot L + (1-\alpha) \cdot R \qquad (1)$$

where L indicates the acoustic signal received from the delay module 23L, R indicates the acoustic signal received from the delay module 23R, and $\alpha$ indicates the coefficient that is specified based on directional characteristic information described later ($0 \leq \alpha \leq 1$).

Specifically, the monaural signal generator 24 adjusts a value of the coefficient $\alpha$ of formula (I) based on the directional characteristic information received from the sight line detector 26 to change a weight for each of acoustic signals "L" and "R". More specifically, when the directional characteristic information indicates an "area L" described later, the monaural signal generator 24 increases the value of the coefficient $\alpha$ to increase the weight of the acoustic signal "L". When the directional characteristic information indicates an "area R" described later, the monaural signal generator 24 decreases the value of the coefficient $\alpha$ to increase the weight of the acoustic signal "R". When the directional characteristic information indicates an "area C" described later, the monaural signal generator 24 halves the value of the coefficient $\alpha$ to equalize the weights of the acoustic signals "L" and "R".

The camera 25 is an imaging device. The camera 25 is disposed such that it faces a space from which the microphones 21L and 21R pick up sound (faces a space direction), i.e., the space to which the loudspeakers 13L and 13R output sound (faces an output direction of the loudspeakers). The camera 25 captures images and outputs imaged data to the sight line detector 26.

The sight line detector 26 analyzes the imaged data received from the camera 25. When detecting an utterer who is present in the output direction of the loudspeakers 13L and 13R, the sight line detector 26 produces directional characteristic information that indicates the location of the utterer in the image with a relative direction (relative position) to the loudspeakers 13L and 13R, and outputs the information to the monaural signal generator 24, the echo canceller 27, the array processor 28, the noise canceller 29, and the echo reduction module 31. As an example of a detection method of an utterer, the sight line detector 26 detects faces and lines of sight of persons in an image of imaged data, and detects a person whose face and line of sight face the frontal direction of the person, i.e., face the camera 25, as an utterer. The known techniques may be used as analysis methods to detect the faces and lines of sight from the imaged data. The directional characteristic information that indicates the relative direction of the utterer (user) to a plurality of loudspeakers depends on positional information of the arrangement of the loudspeakers and a plurality of microphones. Furthermore, the directional characteristic information depends on the picking-up sound directivity of a microphone array set by the arrangement of the microphones, and information indicating which microphone picks up an echo from which loudspeaker depending on the picking-up sound directivity of each microphone.

Figure 2:
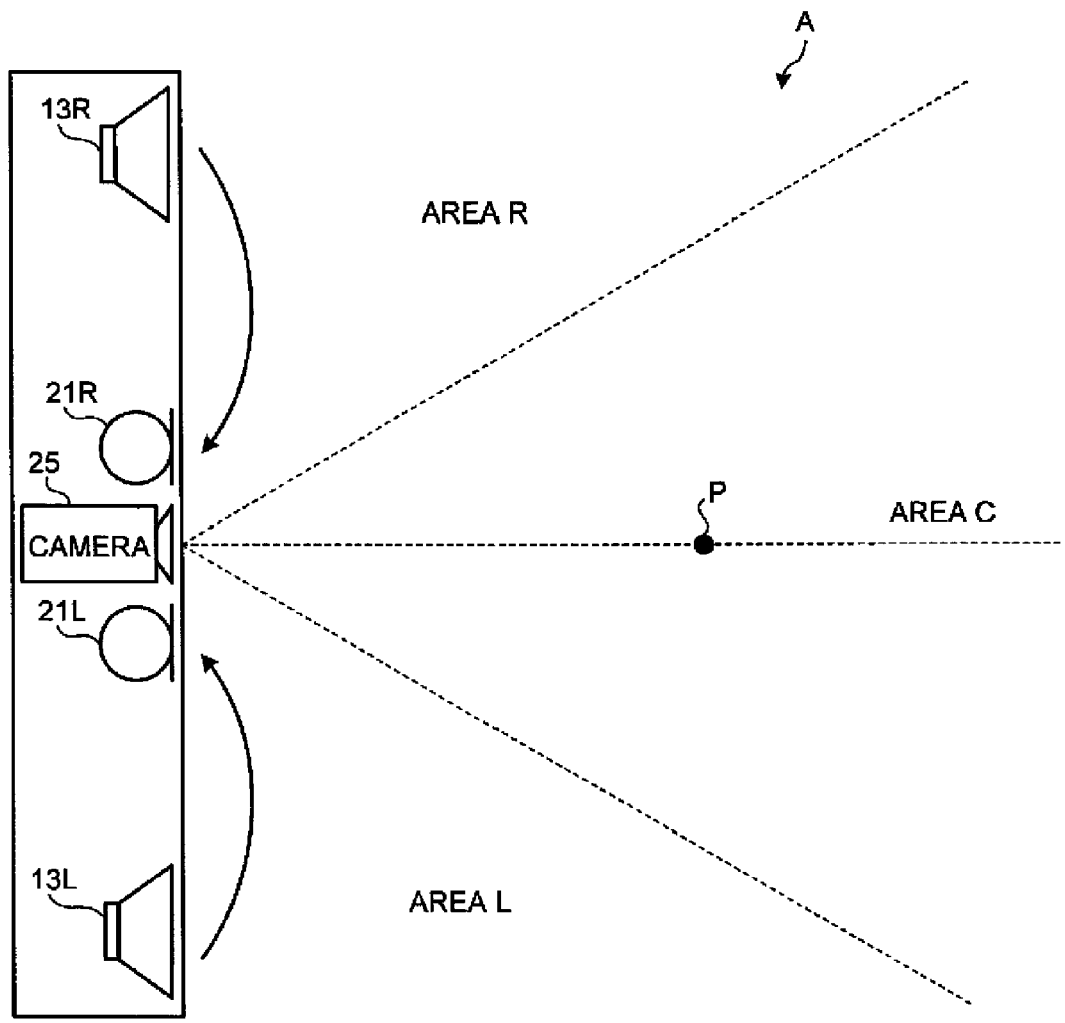
FIG. 2 is an exemplary schematic diagram for explaining operation of a sight line detector in the embodiment.

FIG. 2 is a schematic diagram for explaining operation of the sight line detector 26. FIG. 2 illustrates an arrangement relationship among the loudspeakers 13L and 13R, the microphones 21L and 21R, and the camera 25 in the top view. As illustrated in FIG. 2, the loudspeakers 13L and 13R are disposed apart from each other with a predetermined distance. When viewed from a listening point P, the loudspeaker 13L is disposed on the left side while the loudspeaker 13R is disposed on the right side. The microphones 21L and 21R are disposed between the loudspeakers 13L and 13R. When viewed from the listening point P, the microphone 21L is disposed on the left side while the microphone 21R is disposed on the right side. The camera 25 is disposed between the microphones 21L and 21R, and captures images in a space A to which sound are output. The loudspeakers 13L and 13R, and the microphones 21L and 21R are symmetrically disposed with an imaging direction of the camera 25 as the symmetrical axis.

In the sight line detector 26, the space A is defined as a plurality of divided regions (areas). The sight line detector 26 outputs the directional characteristic information indicating the area in which an utterer is present. For example, when detecting an utterer SP in the area L near the loudspeaker 13L in the space A based on imaged data taken by the camera 25, the sight line detector 26 outputs the directional characteristic information indicating the area L. In the example of FIG. 2, the directional characteristic information indicating the relative direction of the utterer (user) to the loudspeakers is given, for example, with an angle made between the utterer and the loudspeaker R, an angle made between the utterer and the loudspeaker L, and the area in which the utterer is present. In FIG. 2, the space A comprises three areas and each area is defined as follows. The "area C" is defined as a space extending from an imaging position of toward an imaging direction of the camera 25 within an angle of ±22.5 degrees from the imaging position as a reference position. The "area L" is defined, in the space A, as a space that is located near the loudspeaker 13L and excludes the area C. The "area R" is defined, in the space A, as a space that is located near the loudspeaker 13R and excludes the area C. The number of divided areas and the sizes of the areas, however, are not limited to those in FIG. 2. In addition, the arrangement relationship among the loudspeakers 13L and 13R, the microphones 21L and 21R, and the camera 25 is not limited to that in FIG. 2.

Referring back to FIG. 1, the echo canceller 27 removes echo components included in the picked-up sound signals received from the A/D converters 22L and 22R based on the directional characteristic information received from the sight line detector 26. The structure of the echo canceller 27 is described below with reference to FIG. 3.

Figure 3:
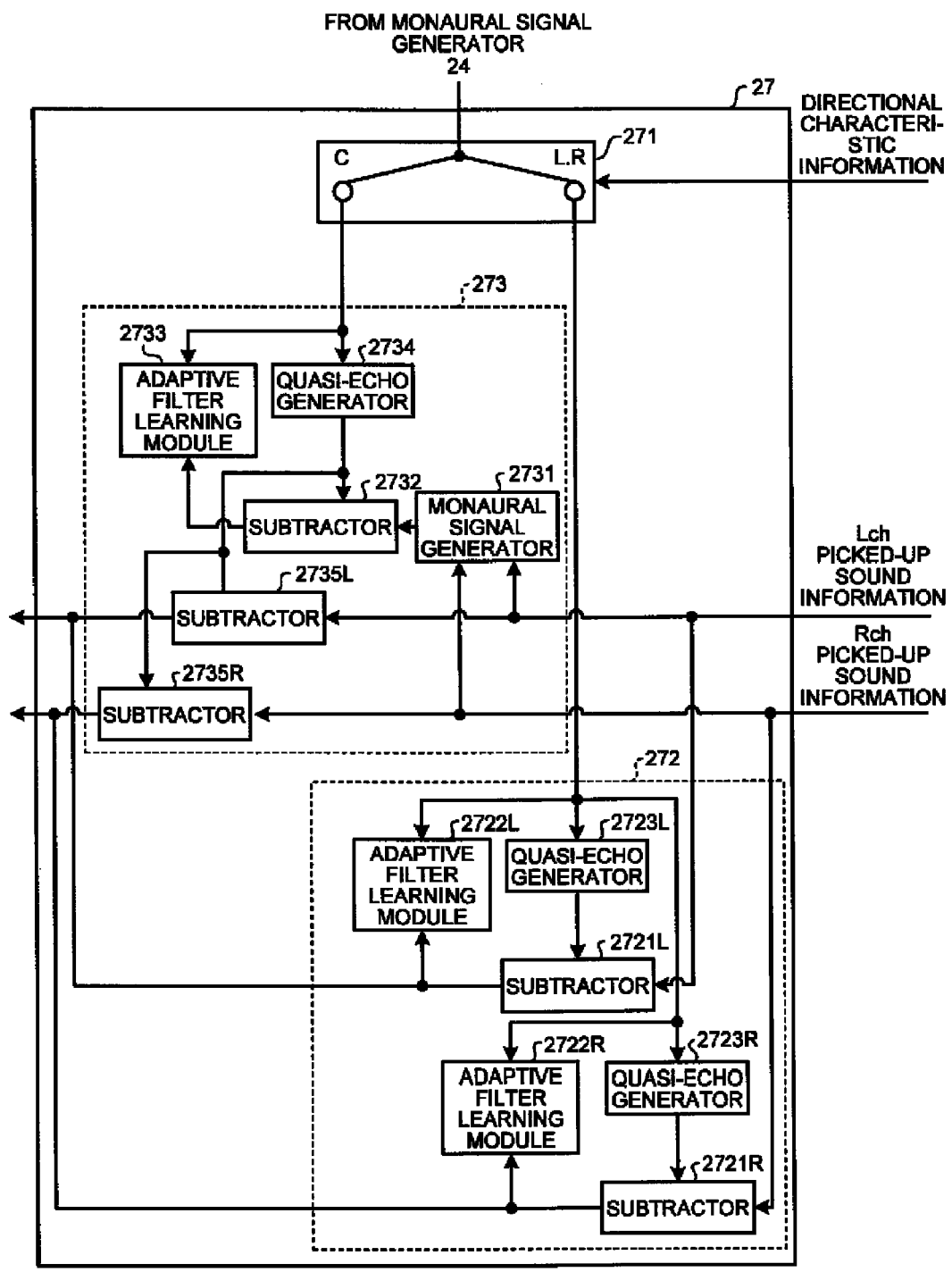
FIG. 3 is an exemplary block diagram of a structure of an echo canceller in the embodiment.

FIG. 3 is a block diagram of a structure of the echo canceller 27. The echo canceller 27 allows a switching module 271 to perform switching based on the directional characteristic information received from the sight line detector 26. Specifically, when the directional characteristic information indicates the "area L" or the "area R", the echo canceller 27 allows the switching module 271 to perform switching to operate a first processor 272 while when the directional characteristic information indicates the "area C", the echo canceller 27 allows the switching module 271 to perform switching to operate a second processor 273.

The first processor 272 comprises subtractors 2721L and 2721R, adaptive filter learning modules 2722L and 2722R, and quasi-echo generators 2723L and 2723R.

The subtractor 2721L subtracts a quasi-echo signal produced by the quasi-echo generator 2723L from the Lch picked-up sound signal received from the A/D converter 22L, and outputs a residual echo signal that is the result of the subtraction to the adaptive filter learning module 2722L and the array processor 28. The adaptive filter learning module 2722L estimates and learns a transfer function between the loudspeaker 13L and the microphone 21L based on the signal received from the monaural signal generator 24 through the switching module 271 as a reference signal and the residual echo signal output from the subtractor 2721L. The quasi-echo generator 2723L multiplies the signal received from the monaural signal generator 24 through the switching module 271 by the transfer function having been estimated and learned by the adaptive filter learning module 2722L to produce the quasi-echo signal, and outputs the quasi-echo signal to the subtractor 2721L.

The subtractor 2721R subtracts the quasi-echo signal produced by the quasi-echo generator 2723R from the Rch picked-up sound signal received from the A/D converter 22R, and outputs the residual echo signal that is the result of the subtraction to the adaptive filter learning module 2722R and the array processor 28. The adaptive filter learning module 2722R estimates and learns the transfer function between the loudspeaker 13R and the microphone 21R based on the signal received from the monaural signal generator 24 through the switching module 271 as the reference signal and the residual echo signal output from the subtractor 2721R. The quasi-echo generator 2723R multiplies the signal received from the monaural signal generator 24 through the switching module 271 by the transfer function estimated and learned by the adaptive filter learning module 2722R (convolute an input signal with a filter coefficient) to produce the quasi-echo signal, and outputs the quasi-echo signal to the subtractor 2721R.

The second processor 273 comprises a monaural signal generator 2731, a subtractor 2732, an adaptive filter learning module 2733, a quasi-echo generator 2734, and subtractors 2735L and 2735R.

The monaural signal generator 2731 calculates a mean value of the Lch picked-up sound signal received from the A/D converter 22L and the Rch picked-up sound signal received from the A/D converter 22R, and outputs the calculation result to the subtractor 2732. The method to calculate the mean value is not limited to above. For example, the linear sum of the two signal values may be divided by two to find the mean value.

The subtractor 2732 subtracts the quasi-echo signal produced by the quasi-echo generator 2734 from the signal received from the monaural signal generator 2731, and outputs the residual echo signal that is the result of the subtraction to the adaptive filter learning module 2733. The adaptive filter learning module 2733 estimates and learns the transfer function between the loudspeaker group (loudspeakers 13L and 13R) and the microphone group (microphones 21L and 21R) based on the signal received from the monaural signal generator 24 through the switching module 271 and the residual echo signal output from the subtractor 2732. The quasi-echo generator 2734 produces the quasi-echo signal by using the signal received from the monaural signal generator 24 through the switching module 271 and the transfer function estimated and learned by the adaptive filter learning module 2733, and outputs the quasi-echo signal to the subtractor 2732, and the subtractors 2735L and 2735R.

The subtractor 2735L subtracts the quasi-echo signal produced by the quasi-echo generator 2734 from the signal received from the A/D converter 22L, and outputs the residual echo signal that is the result of the subtraction to the array processor 28. The subtractor 2735R subtracts the quasi-echo signal produced by the quasi-echo generator 2734 from the signal received from the A/D converter 22R, and outputs the residual echo signal that is the result of the subtraction to the array processor 28.

In this way, when the directional characteristic information indicates the "area C", the echo canceller 27 calculates the mean value of the Lch picked-up sound signal and the Rch picked-up sound signal, and removes an echo component based on the common component in both picked-up sound signals. This processing can reduce the load necessary for removing the echo component compared to the case when the directional characteristic information indicates the "area L" or the "area R".

Referring back to FIG. 1, the array processor 28 selectively extracts a signal traveling from a sound source (an utterer) direction indicated by the directional characteristic information from signals received from the echo canceller 27 by using the directional characteristic information received from the sight line detector 26, and outputs the extracted signal to the noise canceller 29. Specifically, the array processor 28 performs delay processing and other processing on the picked-up sound signals that are picked up by the microphones 21L and 21R and received through the echo canceller 27 to produce a plurality of picked-up sound beam signals having directivity axes in different directions. The array processor 28 selects a picked-up sound beam signal corresponding to a direction indicated by the directional characteristic information received from the sight line detector 26 out of the picked-up sound beam signals, removes an echo from the selected picked-up sound beam signal, and transmits the resulting signal to the noise canceller 29.

The array processor 28 may selectively extract a signal traveling from a direction in which an utterer is present (any of the areas L, R, and C) by tracking a sound source direction, or may selectively extract a signal from an utterer who is present in the specific sound source direction (e.g., the area C). Known techniques are used as methods for extracting a signal from picked-up sound beam signals and removing an echo from the selected picked-up sound beam signal.

The noise canceller 29 functions to suppress a noise component included in the signal after being processed by the array processor 28. The structure of the noise canceller 29 is described below with reference to FIG. 4.

Figure 4:
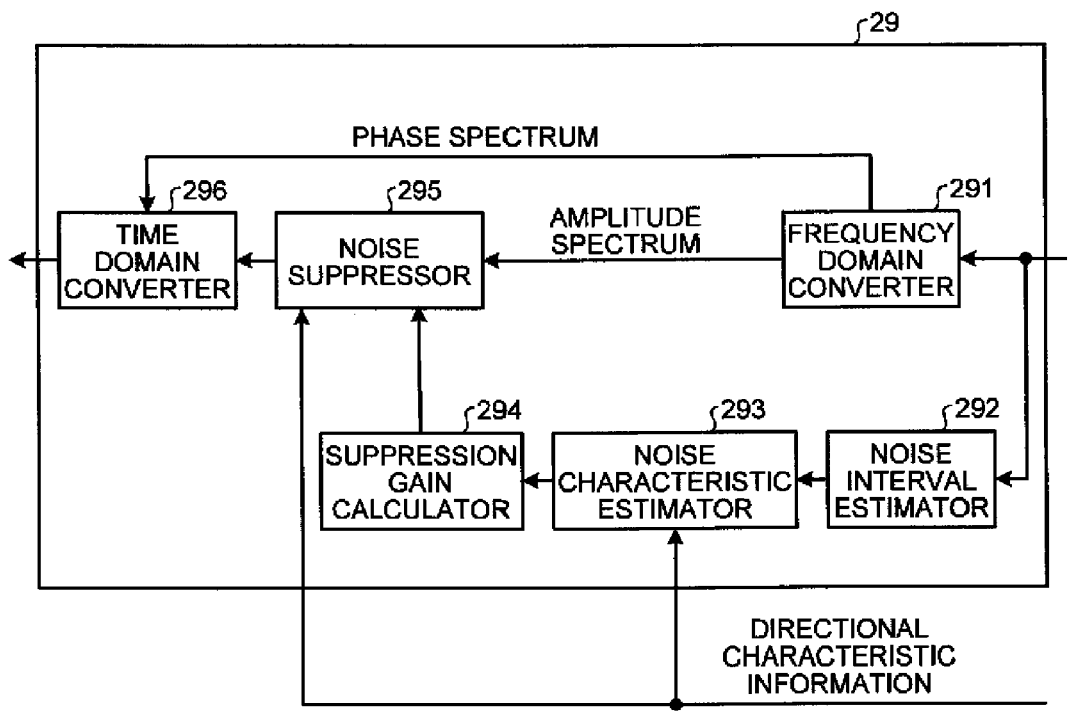
FIG. 4 is an exemplary block diagram of a structure of a noise canceller in the embodiment.

FIG. 4 is a block diagram of a structure of the noise canceller 29. As illustrated in FIG. 4, the noise canceller 29 comprises a frequency domain converter 291, a noise interval estimator 292, a noise characteristic estimator 293, a suppression gain calculator 294, a noise suppressor 295, and a time domain converter 296.

The frequency domain converter 291 converts the signal in a time domain received from the array processor 28 into the signal in a frequency domain, outputs an amplitude spectrum of the converted signal to the noise suppressor 295, and outputs a phase spectrum of the converted signal to the time domain converter 296.

The noise interval estimator 292 estimates an interval having smallest power (e.g., a tiny period of time around time at which power is smallest) in the signal received from the array processor 28 as a noise interval, and outputs the signal (waveform) corresponding to the noise interval to the noise characteristic estimator 293.

The noise characteristic estimator 293 sequentially estimates a characteristic value (noise characteristic) of a surrounding ambient noise from the signal of the noise interval received from the noise interval estimator 292 by using a maximum-likelihood approach, for example, and outputs the estimated noise characteristic to the suppression gain calculator 294.

The noise characteristic estimator 293 receives the directional characteristic information output from the sight line detector 26. When the direction indicated by the directional characteristic information is changed, the noise characteristic estimator 293 shortens a time interval to sequentially estimate and update the characteristic value, or increases an updating amount. When the direction indicated by the directional characteristic information is maintained for a certain period of time after the change, the noise characteristic estimator 293 lengthens the time interval to sequentially estimate and update the characteristic value to the original time interval or decreases the updating amount to the original updating amount. In this way, a follow-up speed of the noise characteristic is speeded up when the area indicated by the directional characteristic information is changed. Accordingly, the noise characteristic of the changed area can be quickly simulated. As a result, lowering of a noise suppression amount can be prevented. Alternatively, the following manner may be employed. A plurality of noise characteristics corresponding to the areas may be stored. A noise characteristic corresponding to the area indicated by the received directional characteristic information is read and updated. The noise characteristic is output to the suppression gain calculator 294.

The suppression gain calculator 294 calculates a suppression gain for sound suppression processing according to the noise characteristic received from the noise characteristic estimator 293.

The noise suppressor 295 performs suppression on the amplitude spectrum received from the frequency domain converter 291 by using the suppression gain calculated by the suppression gain calculator 294 to suppress a noise included in the amplitude spectrum, and outputs the amplitude spectrum after the suppression to the time domain converter 296.

The noise suppressor 295 turns on or off the suppression depending on the directional characteristic information received from the sight line detector 26, and a direction of a noise source identified by a level of the noise included in the amplitude spectrum received from the array processor 28. Specifically, when the array processor 28 is set to track the sound source, the noise suppressor 295 turns on the suppressing if the sound source direction indicated by the directional characteristic information coincides with the direction of the noise source while the noise suppressor 295 turns off the suppressing if both directions do not coincide with each other. When the array processor 28 is set to extract a signal traveling from a specific sound source direction, the noise suppressor 295 turns on the suppressing if the sound source direction indicated by the directional characteristic information coincides with the direction of the specific sound source while the noise suppressor 295 turns off the suppressing if both directions do not coincide with each other.

Figure 5:
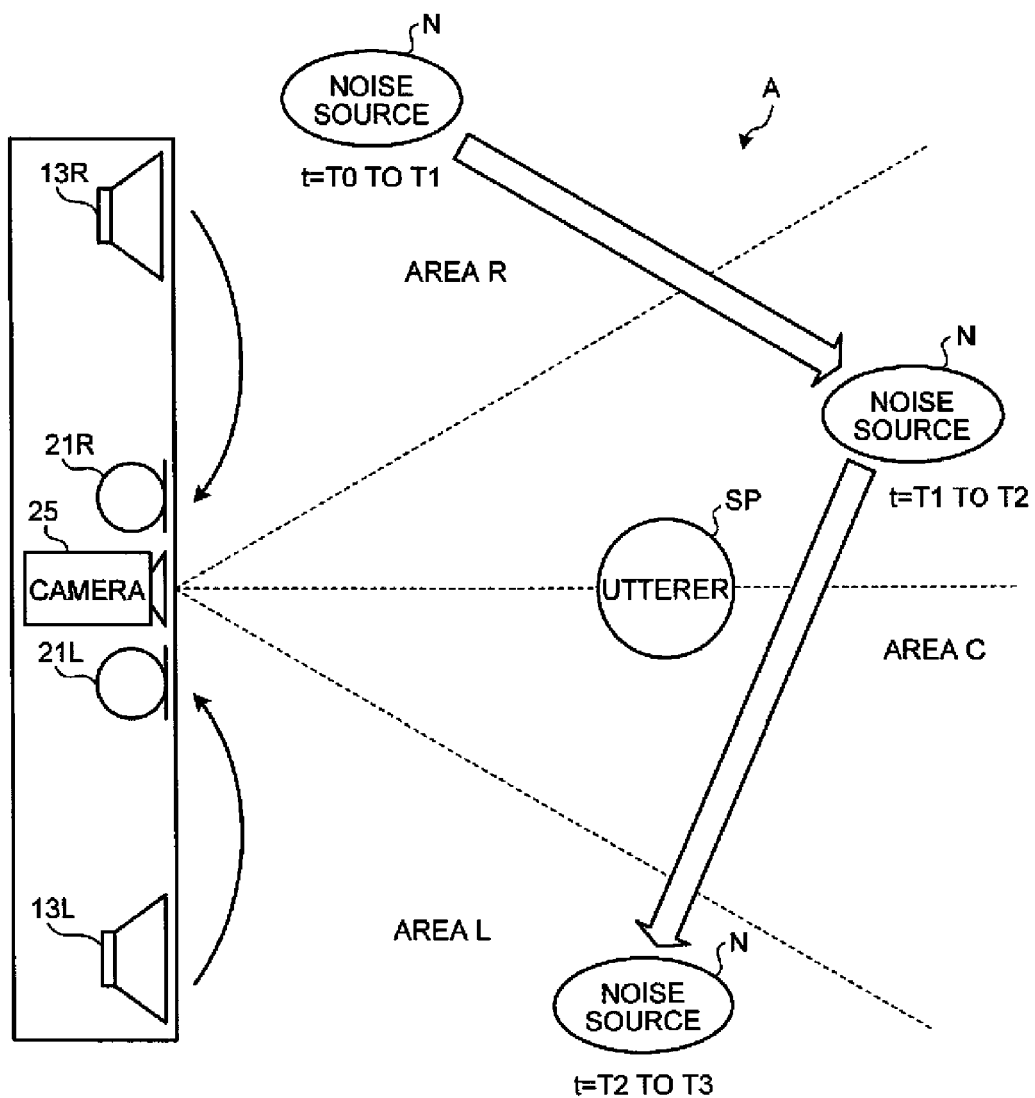
FIG. 5 is an exemplary schematic diagram for explaining operation of the noise canceller in the embodiment.

FIG. 5 is a schematic diagram for explaining operation of the noise canceller 29 (the noise suppressor 295). FIG. 5 illustrates an arrangement relationship among the loudspeakers 13L and 13R, the microphones 21L and 21R, and the camera 25 in the top view, in the same manner as FIG. 3.

As illustrated in FIG. 5, an utterer is present in the area C, and a noise source N moves from the area R to the area C, and then to the area L as time elapses. When the array processor 28 is set to track the sound source, the noise suppressor 295 turns on the suppression if the direction of the sound source indicated by the directional characteristic information, i.e., the area C in which the utterer SP is present, coincides with an appearance direction of the noise source N identified by the level of the noise included in the amplitude spectrum received from the array processor 28 while the noise suppressor 295 turns off the suppressing if both directions do not coincide with each other.

In the example of FIG. 5, the suppression is turned off in a period of time T0 to T1 during which the noise source N is present in the area R because the area C in which the utterer SP is present and the direction of the noise source N (the area R) do not coincide with each other. The suppression is turned on in a period of time T1 to T2 during which the noise source N is present in the area C because the area C in which the utterer SP is present coincides with the direction of the noise source N (the area C). The suppression is turned off in a period of time T2 to T3 during which the noise source N is present in the area L because the area C in which the utterer SP is present and the direction of the noise source N (the area L) do not coincide with each other.

When the array processor 28 is set to extract a signal traveling from a specific sound source direction, the noise suppressor 295 turns on the suppressing if the sound source direction indicated by the directional characteristic information coincides with the specific sound source direction while the noise suppressor 295 turns off the suppressing if both directions do not coincide with each other. In this case, the level of the noise included in the amplitude spectrum received from the array processor 28 is illustrated in FIG. 6.

Figure 6:
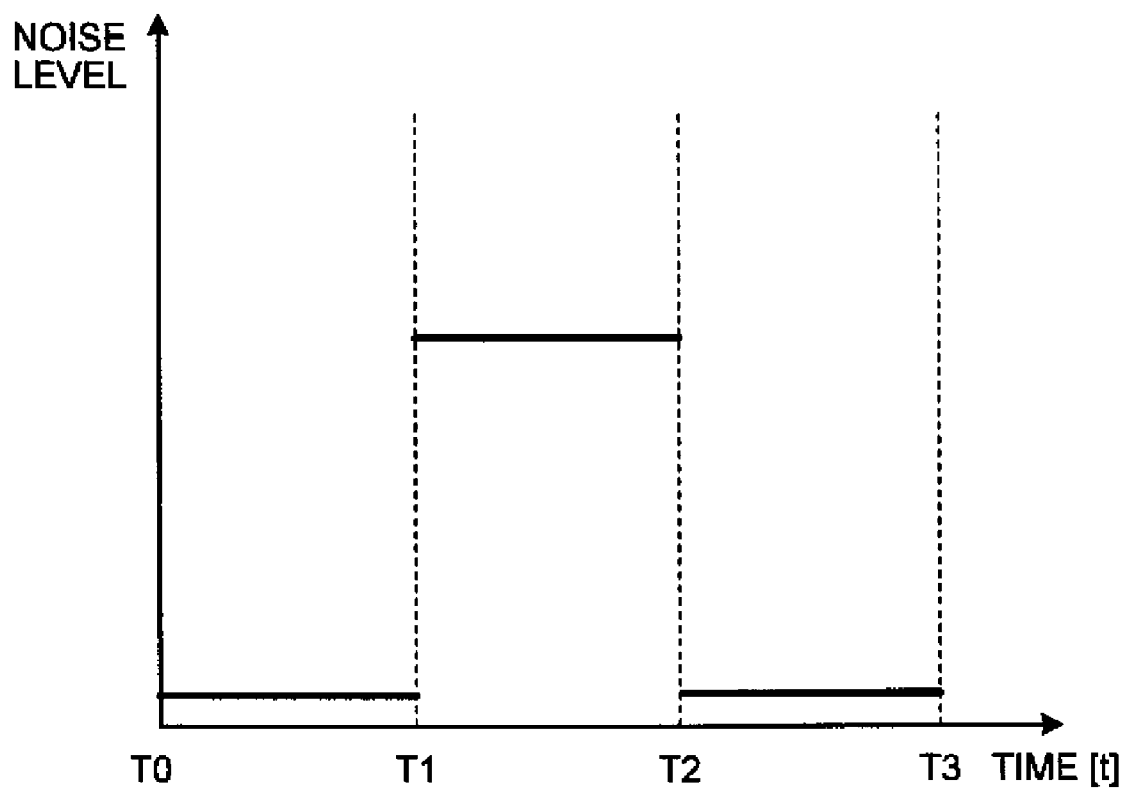
FIG. 6 is an exemplary schematic diagram illustrating a level of a noise included in an amplitude spectrum in the embodiment.

FIG. 6 is a schematic diagram exemplarily illustrating the level of the noise included in the amplitude spectrum when the array processor 28 extracts a signal traveling from a specific sound source direction (the area C). In this case, as illustrated in FIG. 6, the noise level when the sound source direction is the area C is markedly higher than the noise levels of the other areas. In this case, when the directional characteristic information indicates the area C, the noise suppressor 295 turns on the suppression while when the directional characteristic information indicates the other areas the noise suppressor 295 turns off the suppression.

The noise suppressor 295 controls the turning on or off of the suppression in the embodiment. However, the control is not limited to be performed by the noise suppressor 295. The suppression gain calculator 294 may set the suppression gain to zero when the suppression is turned off based on the same turning on or off condition as the noise suppressor 295.

Referring back to FIG. 4, the time domain converter 296 converts the signal in the frequency domain into the signal in the time domain based on the amplitude spectrum received from the noise suppressor 295 and the phase spectrum received from the frequency domain converter 291, and outputs a signal that is the result of the conversion to the echo reduction module 31.

Referring back to FIG. 1, the delay module 30 is a delay circuit, for example, in the same manner as the delay modules 23L and 23R, delays the signal received from the monaural signal generator 24 for a predetermined period of time, and outputs the delayed signal to the echo reduction module 31. As a result of the delay processing performed by the delay module 30, the signal that is output from the monaural signal generator 24 and input to the echo reduction module 31 through the echo canceller 27, the array processor 28, and the noise canceller 29, and the signal that is output from the monaural signal generator 24 and input to the echo reduction module 31 through the delay module 30 synchronize with each other.

The echo reduction module 31 functions to remove an echo component included in the signal after being processed by the noise canceller 29. The structure of the echo reduction module 31 is described below with reference to FIG. 7.

Figure 7:
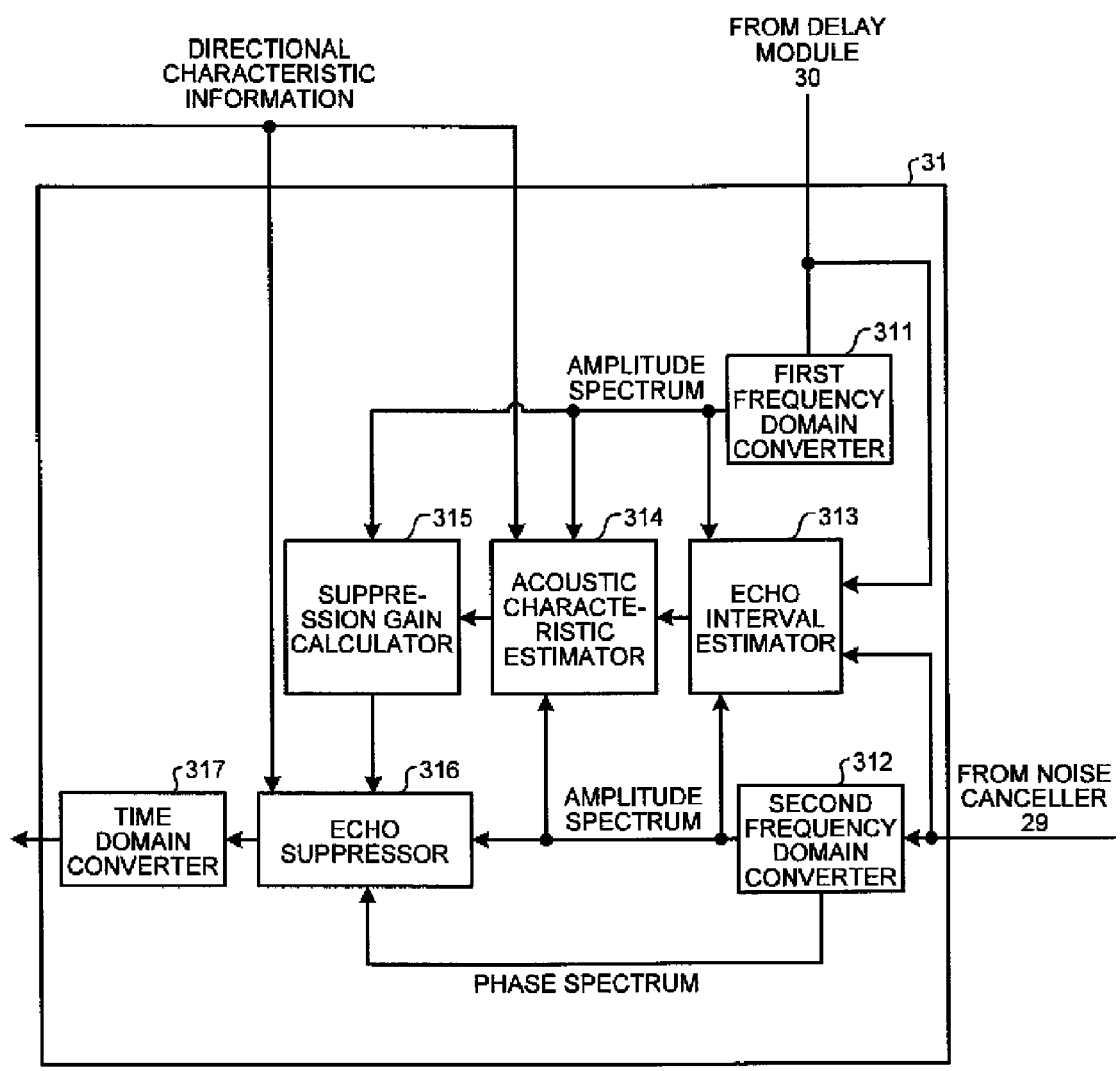
FIG. 7 is an exemplary block diagram of a structure of an echo reduction module in the embodiment.

FIG. 7 is a block diagram of a structure of the echo reduction module 31. As illustrated in FIG. 7, the echo reduction module 31 comprises a first frequency domain converter 311, a second frequency domain converter 312, an echo interval estimator 313, an acoustic characteristic estimator 314, a suppression gain calculator 315, an echo suppressor 316, and a time domain converter 317.

The first frequency domain converter 311 converts the signal in the time domain received from the delay module 30 into the signal in the frequency domain, and outputs the amplitude spectrum of the converted signal to the echo interval estimator 313, the acoustic characteristic estimator 314, and the suppression gain calculator 315. The second frequency domain converter 312 converts the signal in the time domain received from the noise canceller 29 into the signal in the frequency domain, outputs the amplitude spectrum of the converted signal to the echo interval estimator 313, the acoustic characteristic estimator 314, and the echo suppressor 316, and outputs the phase spectrum of the converted signal to the time domain converter 317.

The echo interval estimator 313 receives the signal from the noise canceller 29, the signal from the delay module 30, the amplitude spectrum from the first frequency domain converter 311, and the amplitude spectrum from the second frequency domain converter 312. The echo interval estimator 313 notifies the acoustic characteristic estimator 314 of an echo interval in which it is estimated that an echo occurs based on a difference value of the signal from the noise canceller 29 and the signal from the delay module 30, and a difference value between the amplitude spectra, for example.

The acoustic characteristic estimator 314 receives the amplitude spectrum from the first frequency domain converter 311, the amplitude spectrum from the second frequency domain converter 312, and the echo interval notified by the echo interval estimator 313. The acoustic characteristic estimator 314 estimates an acoustic characteristic of the echo component from a difference of two amplitude spectra in the echo interval notified by the echo interval estimator 313, and outputs the estimated acoustic characteristic to the suppression gain calculator 315.

The acoustic characteristic estimator 314 receives the directional characteristic information output from the sight line detector 26. When the direction indicated by the directional characteristic information is changed, the acoustic characteristic estimator 314 shortens the time interval to sequentially estimate and update the acoustic characteristic or increases the updating amount. When the direction indicated by the directional characteristic information is maintained for a certain period of time after the change, the acoustic characteristic estimator 314 lengthens the time interval to sequentially estimate and update the acoustic characteristic to the original time interval or decreases the updating amount to the original updating amount. In this way, a follow-up speed of the acoustic characteristic is speeded up when the area indicated by the directional characteristic information is changed. Accordingly, the acoustic characteristic of the changed area can be quickly simulated. As a result, lowering of an echo suppression amount can be prevented. Alternatively, the following manner may be employed. A plurality of acoustic characteristics corresponding to the areas may be stored. An acoustic characteristic corresponding to the area indicated by the received directional characteristic information is read and updated. The read acoustic characteristic is output to the suppression gain calculator 315.

The suppression gain calculator 315 calculates a suppression gain for echo suppression according to the acoustic characteristic received from the acoustic characteristic estimator 314, and outputs the suppression gain to the echo suppressor 316.

The echo suppressor 316 performs suppression on the amplitude spectrum received from the second frequency domain converter 312 by using the suppression gain calculated by the suppression gain calculator 315 to suppress an echo component included in the amplitude spectrum, and outputs the amplitude spectrum after the suppression to the time domain converter 296.

The echo suppressor 316 turns on or off depending on the directional characteristic information received from the sight line detector 26, and a signal extraction setting in the noise canceller 29. Specifically, when the array processor 28 is set to extract a signal traveling from a specific sound source direction (e.g., the area C), the echo suppressor 316 turns off the suppressing if the sound source direction indicated by the directional characteristic information coincides with the specific sound source direction while the echo suppressor 316 turns on the suppressing if both directions do not coincide with each other. When the array processor 28 is set to track the sound source, the echo suppressor 316 turns on the suppressing for all of the sound source directions.

Figure 8:
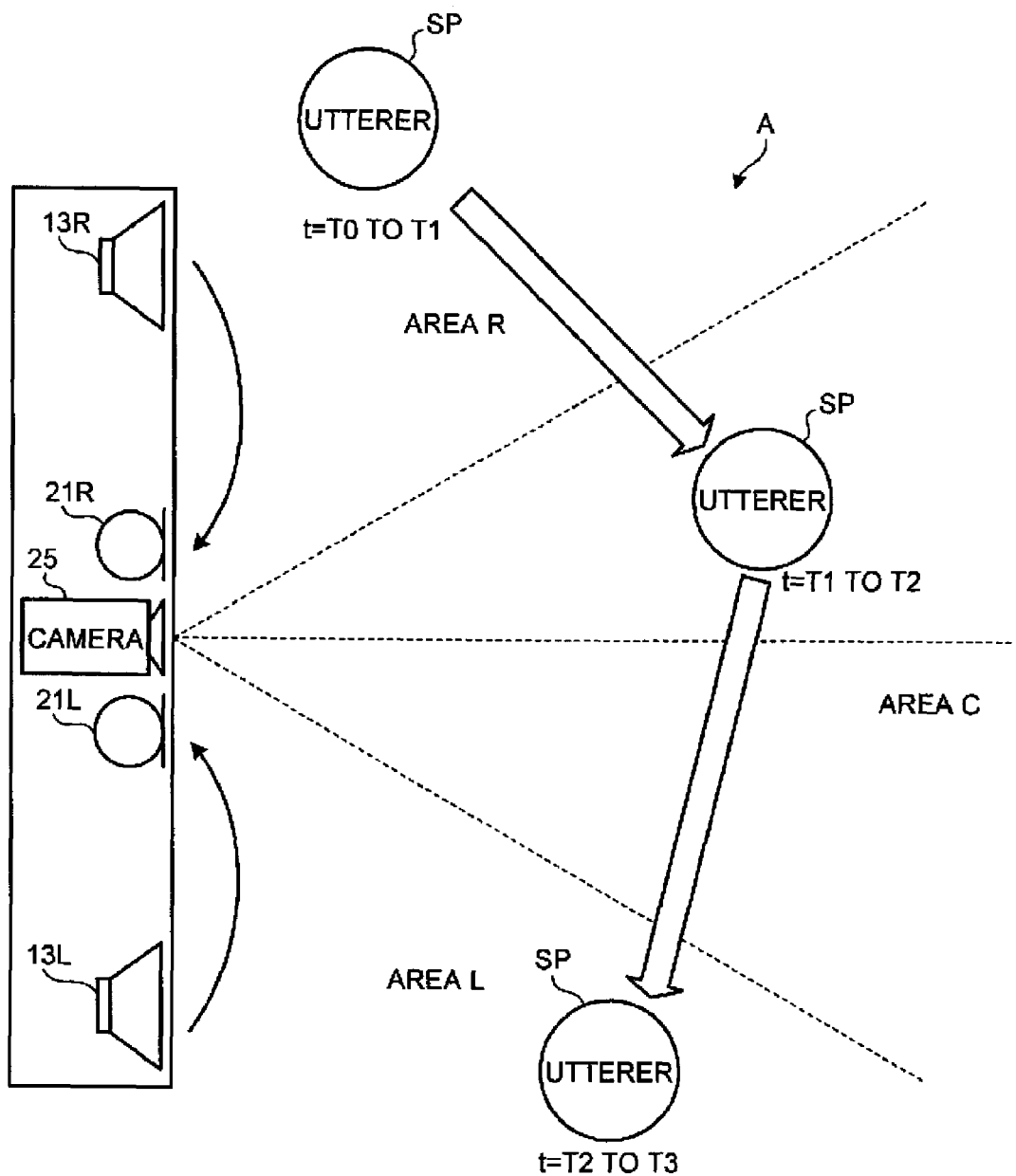
FIG. 8 is an exemplary schematic diagram for explaining operation of the echo reduction module in the embodiment.

FIG. 8 is a schematic diagram for explaining operation of the echo reduction module 31 (the echo suppressor 316). FIG. 8 illustrates an arrangement relationship among the loudspeakers 13L and 13R, the microphones 21L and 21R, and the camera 25 in the top view, in the same manner as FIG. 3.

As illustrated in FIG. 8, the utterer SP moves from the area R to the area C, and then to the area L as time elapses. The level of an echo included in the amplitude spectrum received from the second frequency domain converter 312 is illustrated in FIG. 9 when the array processor 28 is set to extract a signal traveling from the area C.

Figure 9:
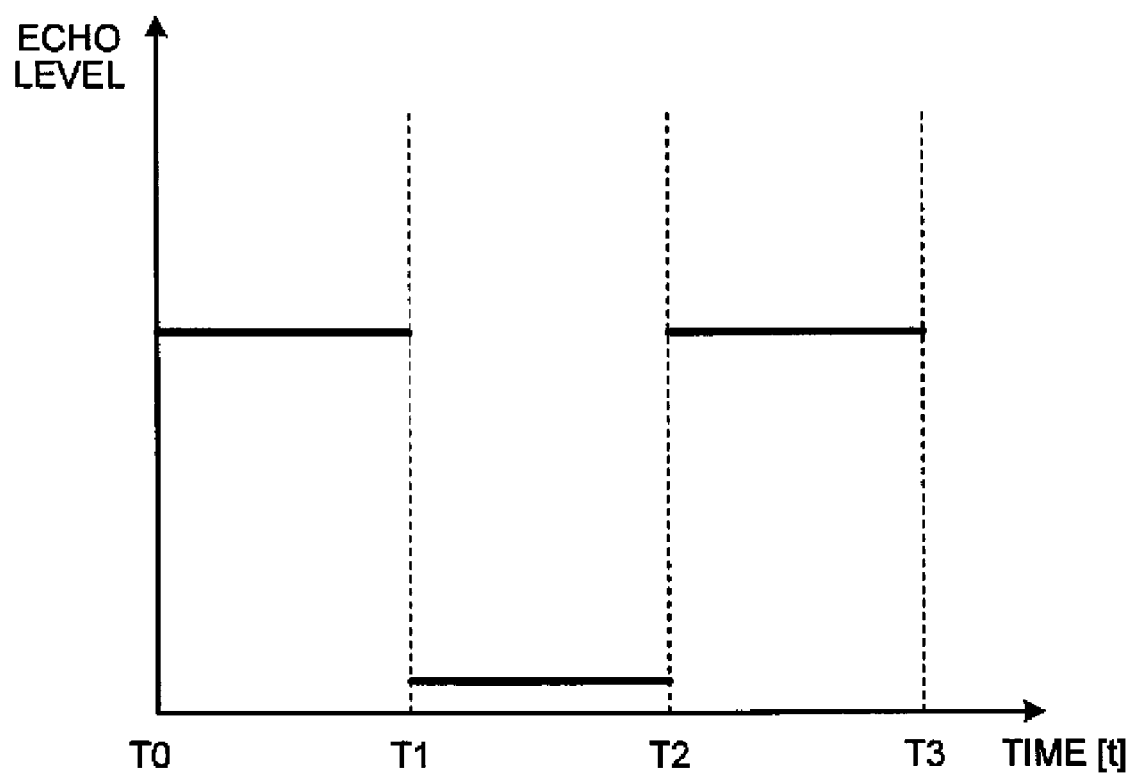
FIG. 9 is an exemplary schematic diagram illustrating a level of an echo included in the amplitude spectrum in the embodiment.

FIG. 9 is a schematic diagram exemplarily illustrating the level of the echo included in the amplitude spectrum when the array processor 28 extracts a signal traveling from a specific sound source direction (the area C). As illustrated in FIG. 9, the echo level when the sound source direction is the area C is reduced compared to the echo levels of the other areas as a result of processing by the array processor 28. In this case, when the directional characteristic information indicates the area C, the echo suppressor 316 turns off the suppression while when the directional characteristic information indicates the other areas the noise suppressor 295 turns on the suppression.

The echo suppressor 316 controls the turning on or off of the suppression in the embodiment. However, the control is not limited to be performed by the echo suppressor 316. The suppression gain calculator 315 may set the suppression gain to zero when the suppression is turned off based on the same turning on or off condition as the echo suppressor 316.

In the signal processor 20, the signal after the suppression performed by the echo reduction module 31 is output to an external apparatus (not illustrated). As described above, the signal processor 20 identifies an utterer presence direction relative to the signal processor 100 as the directional characteristic information, removes and suppresses a disturbance signal such as an echo and a noise based on the direction indicated by the directional characteristic information, enabling voices uttered by the utterer to be effectively produced as clear voices.

While the embodiment has been described, the embodiment has been presented by way of example only, and is not intended to limit the scope of the invention. The embodiment described herein may be embodied in a variety of other forms. Furthermore, various omissions, substitutions and changes of the embodiment described herein may be made without departing from the spirit of the invention. The accompanying claims and their equivalents are intended to cover the embodiment or modifications as would fall within the scope and spirit of the invention.

For example, in the embodiment, a direction in which an utterer is present is identified by the functions of the camera 25 and the sight line detector 26. However, the direction is not limited to be detected by the functions of the camera 25 and the sight line detector 26. The direction in which an utterer is present may be identified based on picked-up sound signals picked up by the microphones 21L and 21R. This structure is described below as a modification example 1 of the embodiment.

Figure 10:
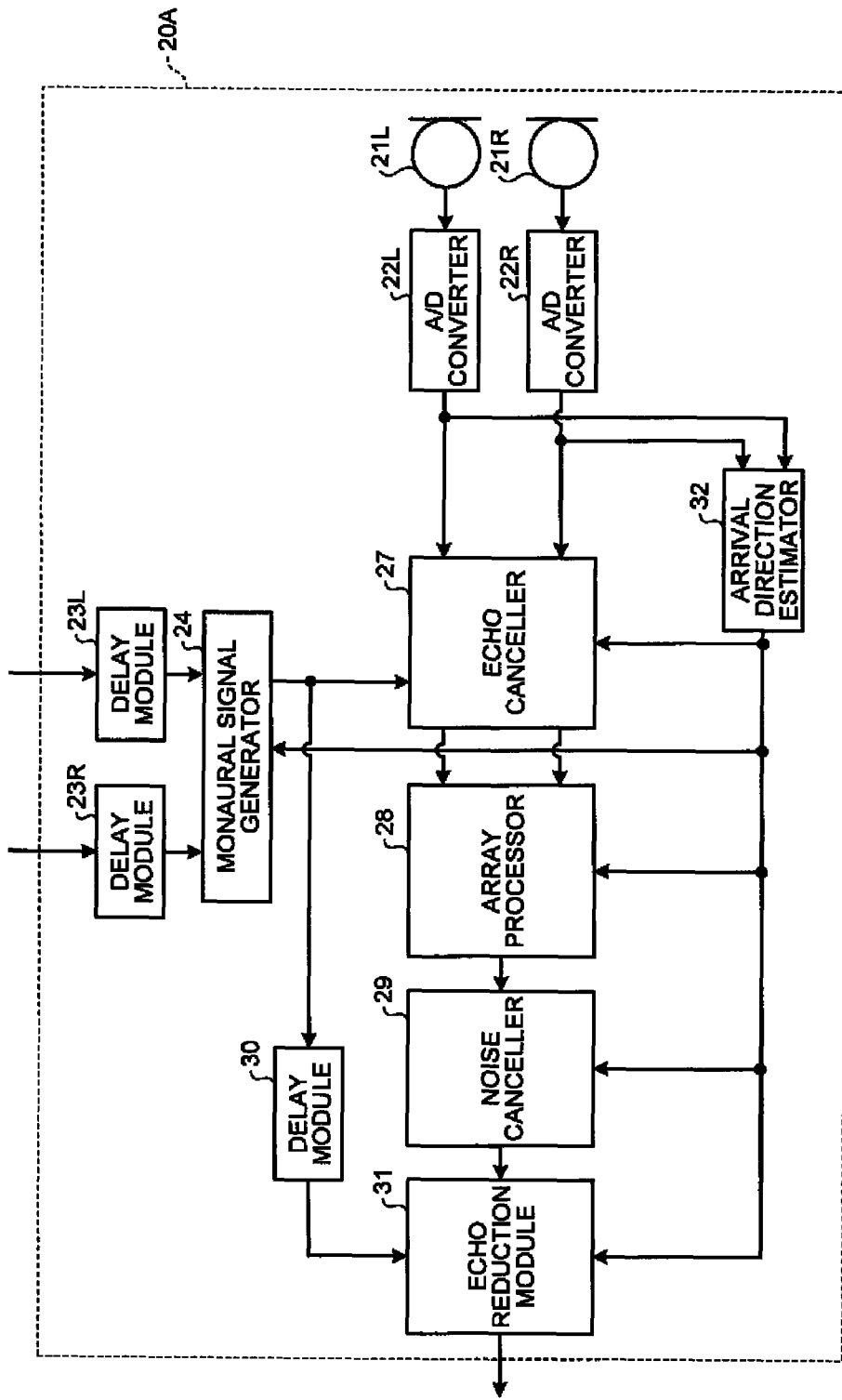
FIG. 10 is an exemplary block diagram of a structure of a signal processor according to a modification example 1 of the embodiment.

FIG. 10 is a block diagram of a structure of a signal processor 20A according to the modification example 1 of the embodiment. In the modification example 1, the same elements as the embodiment are labeled with the same reference numerals, and description thereof is omitted.

As illustrated in FIG. 10, the signal processor 20A comprises the microphones 21L and 21R, the A/D converters 22L and 22R, the delay modules 23L and 23R, the monaural signal generator 24, the echo canceller 27, the array processor 28, the noise canceller 29, the delay module 30, the echo reduction module 31, and an arrival direction estimator 32.

The arrival direction estimator 32 receives the Lch picked-up sound signal output from the A/D converter 22L and the Rch picked-up sound signal output from the A/D converter 22R. The arrival direction estimator 32 performs delay processing, for example, on each of picked-up sound signals picked up by the microphones 21L and 21R to produce a plurality of picked-up sound beam signals having directivity axes in different directions. The arrival direction estimator 32 selects a picked-up sound beam signal having a highest signal level out of the picked-up sound beam signals, identifies a direction corresponding to the picked-up sound beam signal as the utterer presence direction, and outputs the directional characteristic information indicating the utterer presence direction to the monaural signal generator 24, the echo canceller 27, the array processor 28, the noise canceller 29, and the echo reduction module 31.

In this way, the arrival direction estimator 32, which is provided instead of the camera 25 and the sight line detector 26, can identify the utterer presence direction based on the sound picked up by the microphones 21L and 21R. The modification example 1, thus, can exhibit the same effect as the embodiment, and can also simplify the structure of the signal processor.

In the embodiment, the signal processing to remove and suppress disturbance signals included in the sound picked up by the microphones 21L and 21R is performed by the echo canceller 27, the array processor 28, the noise canceller 29, and the echo reduction module 31 in this order. However, the structure to perform the signal processing is not limited to the structure of the signal processor 20. The structure of the signal processor 20 may be modified by changing the performing order of the signal processing, or integrating the functions to omit specific signal processing, for example. Examples of the structural modification of the signal processor 20 are described below as modification examples 2 and 3.

Figure 11:
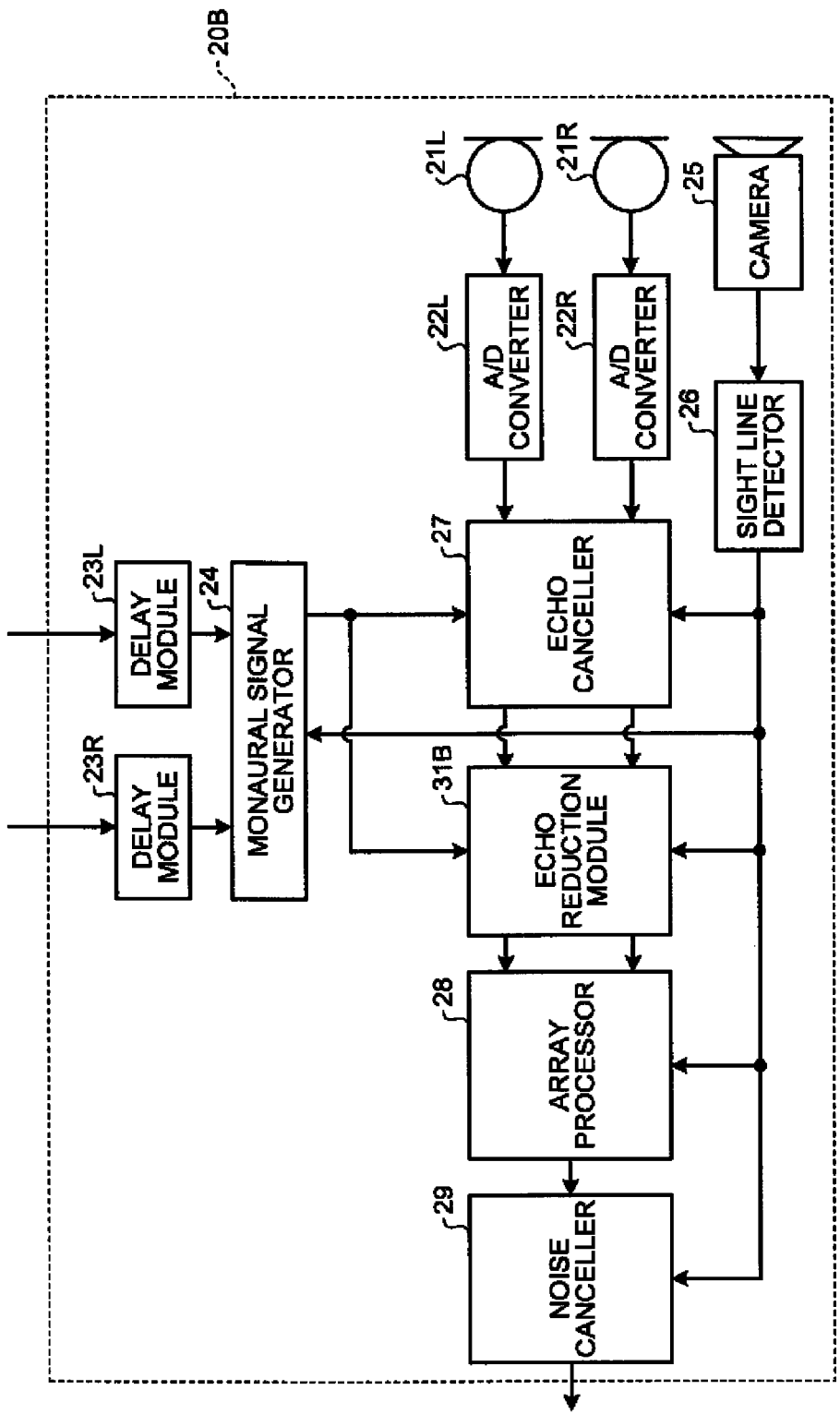
FIG. 11 is an exemplary block diagram of a structure of a signal processor according to a modification example 2 of the embodiment.

FIG. 11 is a block diagram of a structure of a signal processor 20B according to the modification example 2 of the embodiment. In the modification example 2, the same elements as the embodiment are labeled with the same reference numerals, and description thereof is omitted.

The signal processor 20B comprises the microphones 21L and 21R, the A/D converters 22L and 22R, the delay modules 23L and 23R, the monaural signal generator 24, the camera 25, the sight line detector 26, the echo canceller 27, an echo reduction module 31B, the array processor 28, and the noise canceller 29. The structure of the signal processor 20B differs from that of the signal processor 20 illustrated in FIG. 1 in that the delay module 30 is excluded, and the signal processing is performed by the echo reduction module 31B, the array processor 28, and the noise canceller 29 in this order after processing of the echo canceller 27.

Figure 12:
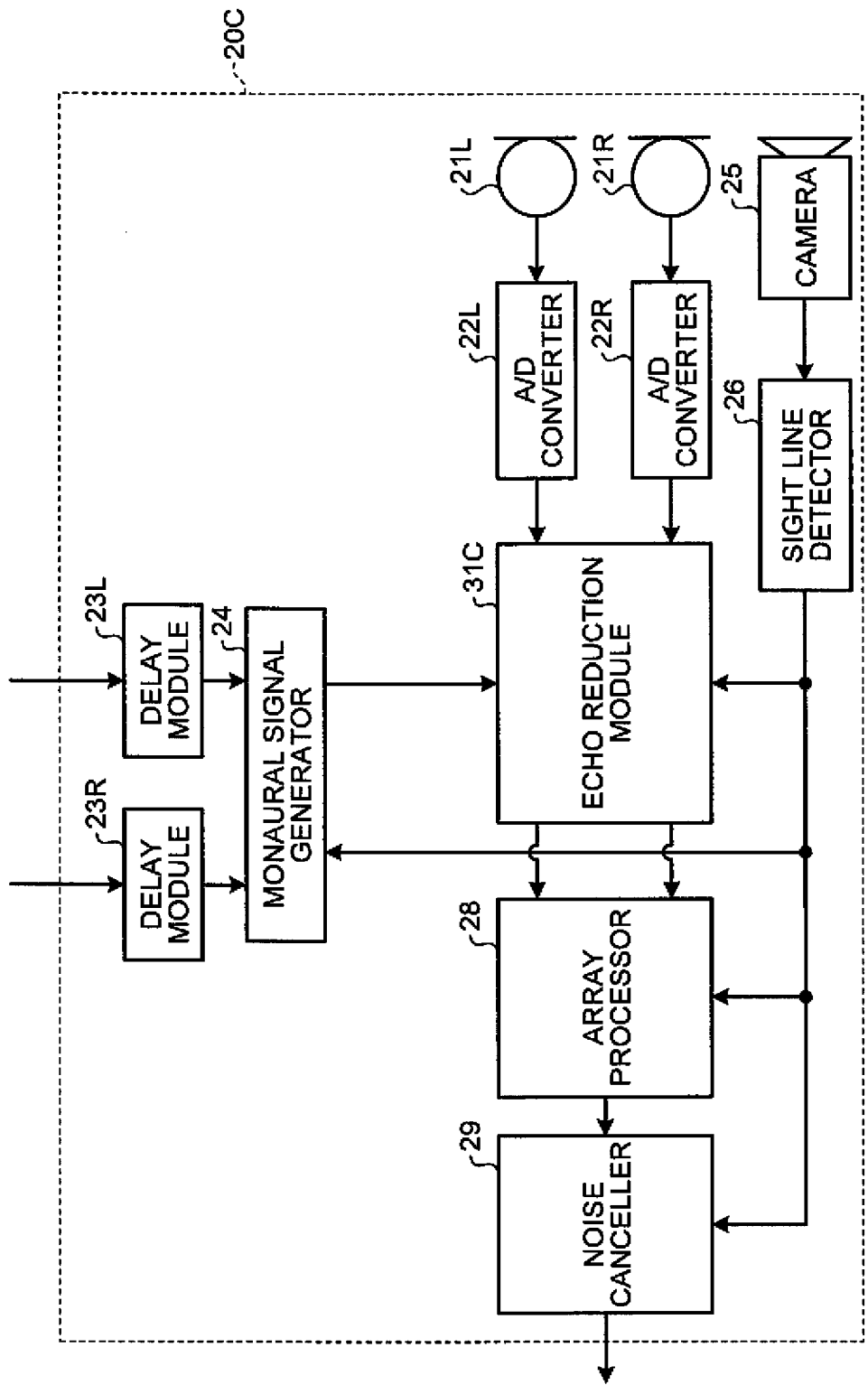
FIG. 12 is an exemplary block diagram of a structure of a signal processor according to a modification example 3 of the embodiment.

FIG. 12 is a block diagram of a structure of a signal processor 20C according to the modification example 3 of the embodiment. In the modification example 3, the same elements as the embodiment are labeled with the same reference numerals, and description thereof is omitted.

The signal processor 20C comprises the microphones 21L and 21R, the A/D converters 22L and 22R, the delay modules 23L and 23R, the monaural signal generator 24, the camera 25, the sight line detector 26, an echo reduction module 31C, the array processor 28, and the noise canceller 29. The structure of the signal processor 20C differs from that of the signal processor 20 illustrated in FIG. 1 in that the delay module 30 and the echo canceller 27 are excluded, and the signal processing is performed by the echo reduction module 31C, the array processor 28, and the noise canceller 29 in this order.

When the structures of the signal processors 20B and 20C are employed, the echo reduction modules 31B and 31C each receives the Lch and the Rch picked-up sound signals, i.e., two signal lines. Therefore, the echo reduction modules 31B and 31C adopt the structure illustrated in FIG. 13 instead of the structure illustrated in FIG. 7.

Figure 13:
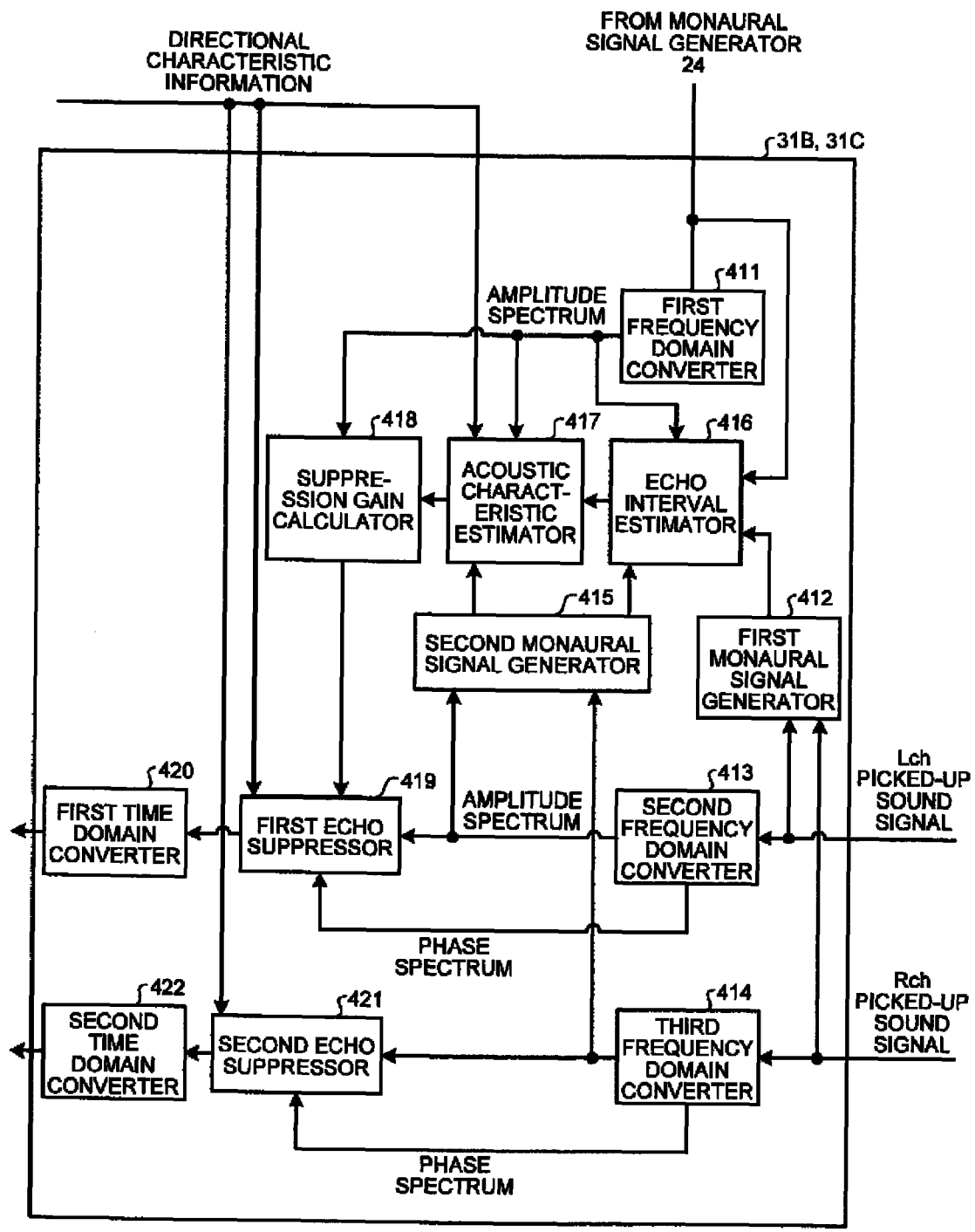
FIG. 13 is an exemplary block diagram of a structure of an echo reduction module according to the modification examples 2 and 3.

FIG. 13 is a block diagram of a structure of the echo reduction modules 31B and 31C according to the modification examples 2 and 3. As illustrated in FIG. 13, each of the echo reduction modules 31B and 31C comprises a first frequency domain converter 411, a first monaural signal generator 412, a second frequency domain converter 413, a third frequency domain converter 414, a second monaural signal generator 415, an echo interval estimator 416, an acoustic characteristic estimator 417, a suppression gain calculator 418, a first echo suppressor 419, a first time domain converter 420, a second echo suppressor 421, and a second time domain converter 422.

The first frequency domain converter 411 converts the signal in the time domain received from the monaural signal generator 24 into the signal in the frequency domain, and outputs the amplitude spectrum of the converted signal to the echo interval estimator 416, the acoustic characteristic estimator 417, and the suppression gain calculator 418.

The first monaural signal generator 412 calculates a mean value of the Lch picked-up sound signal received from the A/D converter 22L and the Rch picked-up sound signal received from the A/D converter 22R, and outputs the calculation result to the echo interval estimator 416.

The second frequency domain converter 413 converts the Lch picked-up sound signal in the time domain received from the A/D converter 22L into the signal in the frequency domain, outputs the amplitude spectrum of the converted signal to the second monaural signal generator 415 and the first echo suppressor 419, and outputs the phase spectrum of the converted signal to the first time domain converter 420. The third frequency domain converter 414 converts the Rch picked-up sound signal in the time domain received from the A/D converter 22R into the signal in the frequency domain, outputs the amplitude spectrum of the converted signal to the second monaural signal generator 415 and the second echo suppressor 421, and outputs the phase spectrum of the converted signal to the second time domain converter 422.

The second monaural signal generator 415 calculates a mean value of the amplitude spectra each received from the second frequency domain converter 413 and the third frequency domain converter 414, and outputs the calculation result to the echo interval estimator 416 and the acoustic characteristic estimator 417.

The echo interval estimator 416 receives the signal from the monaural signal generator 24, the amplitude spectrum from the first frequency domain converter 411, the signal from the first monaural signal generator 412, and the amplitude spectrum from the second monaural signal generator 415. The echo interval estimator 416 notifies the acoustic characteristic estimator 417 of an echo interval in which it is estimated that an echo occurs based on a difference value of the signal from the first monaural signal generator 412 and the signal from the monaural signal generator 24, and a difference value between the amplitude spectra, for example, by the same function as the echo interval estimator 313.

The acoustic characteristic estimator 417 receives the amplitude spectrum from the first frequency domain converter 411, the amplitude spectrum from the second monaural signal generator 415, and the echo interval notified by the echo interval estimator 416. The acoustic characteristic estimator 417 estimates an acoustic characteristic of the echo component from a difference of two amplitude spectra in the echo interval notified by the echo interval estimator 416, and outputs the estimated acoustic characteristic to the suppression gain calculator 418 in the same function as the acoustic characteristic estimator 314.

The acoustic characteristic estimator 417 receives the directional characteristic information output from the sight line detector 26, and changes the time interval to estimate the acoustic characteristic based on the direction indicated by the directional characteristic information. Specifically, the acoustic characteristic estimator 417 shortens the time interval when the directional characteristic information indicates the "area C" compared to the time interval when the directional characteristic information indicates the "area L" or the "area R". As a result, the acoustic characteristic estimator 417 increases an estimation speed of the acoustic characteristic when an utterer is present in the "area C" compared to the case when the utterer is present in the other areas. In the embodiment, the acoustic characteristic is sequentially estimated. However, the acoustic characteristic is not limited to be sequentially estimated. For example, acoustic characteristics corresponding to the respective areas may be preliminarily stored, and an acoustic characteristic of the direction corresponding to the received directional characteristic information may be output to the suppression gain calculator 418.

The suppression gain calculator 418 calculates a suppression gain for echo suppression according to the acoustic characteristic received from the acoustic characteristic estimator 417, and outputs the suppression gain to the first echo suppressor 419 and the second echo suppressor 421.

The first echo suppressor 419 performs suppression on the amplitude spectrum received from the second frequency domain converter 413 by using the suppression gain calculated by the suppression gain calculator 418 to suppress an echo component included in the amplitude spectrum, and outputs the amplitude spectrum after the suppression to the first time domain converter 420. The first echo suppressor 419 may perform suppression based on the directional characteristic information in the same manner as the echo suppressor 316.

The first time domain converter 420 converts the signal in the frequency domain into the signal in the time domain based on the amplitude spectrum received from the first echo suppressor 419 and the phase spectrum received from the second frequency domain converter 413, and outputs a signal that is the result of the conversion to the array processor 28 as the Lch picked-up sound signal.

The second echo suppressor 421 performs suppression on the amplitude spectrum received from the third frequency domain converter 414 by using the suppression gain calculated by the suppression gain calculator 418 to suppress an echo component included in the amplitude spectrum, and outputs the amplitude spectrum after the suppression to the second time domain converter 422. The second echo suppressor 421 may perform suppression based on the directional characteristic information in the same manner as the echo suppressor 316.

The second time domain converter 422 converts the signal in the frequency domain into t the signal in the time domain based on the amplitude spectrum received from the second echo suppressor 421 and the phase spectrum received from the third frequency domain converter 414, and outputs a signal that is the result of the conversion to the array processor 28 as the Rch picked-up sound signal.

The use of the echo reduction modules 31B and 31C thus structured can realize the signal processors 20B and 20C. In the echo reduction modules 31B and 31C thus structured, a mean value of the Lch picked-up sound signal and the Rch picked-up sound signal is calculated, and an echo component is suppressed based on the common component in both picked-up sound signals. Therefore, the load necessary for suppressing the echo component can be reduced.

The examples of the modified structure of the signal processor 20 are described above as the modification examples 2 and 3. In addition, as another modified structure, disturbance signals may be removed and suppressed by three processors, i.e., the echo canceller 27, the echo reduction module 31B (or 31C), and the array processor 28 in this order. Furthermore, as still another modified structure, disturbance signals may be removed and suppressed by two processor, i.e., the echo reduction module 31B (or 31C), and the array processor 28 in this order.

In the embodiment, two loudspeakers (the loudspeakers 13L and 13R) are used. However, the number of loudspeakers is not limited to two. More than two loudspeakers may be used. In the embodiment, two microphones (the microphones 21L and 21R) are used. However, the number of microphones is not limited to two. More than two microphones may be used.

The signal processor of the embodiment can be applied to any applications. For example, the signal processor is applicable as a device for pre-processing such as voice recognition in various apparatuses such as cell-phones, notebook personal computers, and tablet terminals.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus comprising:
a plurality of loudspeakers configured to reproduce sound of a plurality of channels;
a plurality of microphones configured to pick up sound of a plurality of channels;
a detector configured to detect a user who is present in a direction of a space from which the plurality of microphones pick up the sound, and output directional characteristic information indicating a relative direction of the user to the plurality of loudspeakers; and
a signal processor configured to switch contents of processing to reduce a disturbance signal included in a picked-up sound signal of the sound picked up by the plurality of microphones from the picked-up sound signal based on the relative direction indicated by the directional characteristic information.

2. The apparatus of claim 1, wherein the detector is configured to detect a user based on image data obtained by an imaging module configured to capture an image of the user who is present in an output direction of the plurality of loudspeakers, and output the directional characteristic information indicating the relative direction of a location where the user is present in the imaged data.

3. The apparatus of claim 1, wherein the detector is configured to produce a plurality of beam signals having directivity axes in different directions based on the picked-up sound signal of the reproduced sound picked up by the plurality of microphones, and identify a direction corresponding to the beam signal having a highest signal level of the plurality of beam signals as a direction where the user is present, and output the directional characteristic information indicating the direction where the user is present as the relative direction.

4. The apparatus of claim 1, wherein
the signal processor comprises an array processor configured to perform array processing in which a sensitivity is different depending on a direction in which the reproduced sound is picked up, and
the array processor sets the sensitivity for the direction corresponding to the relative direction indicated by the directional characteristic information higher than the sensitivity for the other directions.

5. The apparatus of claim 1, wherein
the signal processor comprises an echo component removal module configured to set the reproduced sound as a reference signal, and remove an echo component included in the picked-up sound signal of the reproduced sound picked up by the plurality of microphones based on a difference between the picked-up sound signal and the reference signal, and
the echo component removal module is configured to generate a monaural signal from the picked-up sound signals of the plurality of channels based on the relative direction indicated by the directional characteristic information.

6. The apparatus of claim 5, further comprising a monaural signal generator configured to generate a monaural signal from the reproduced sound of the plurality of channels, wherein
the echo component removal module is configured to use the monaural signal generated by the monaural signal generator as the reference signal.

7. The apparatus of claim 6, wherein the monaural signal generator is configured to change a weight coefficient in generating the monaural signal from the reproduced sound of a respective one of the plurality of channels based on the relative direction indicated by the directional characteristic information.

8. The apparatus of claim 1, wherein
the signal processor further comprises a noise component suppressor configured to estimate a noise characteristic of a noise component included in the picked-up sound signal, and determine a gain according to the estimated noise characteristic to suppress the noise component, and
the noise component suppressor is configured to change an efficiency characteristic to estimate the noise characteristic based on the relative direction indicated by the directional characteristic information.

9. The apparatus of claim 8, wherein the noise suppressor is configured to suppress the noise component if the relative direction indicated by the directional characteristic information is identical to a predetermined direction.

10. The apparatus of claim 8, wherein the noise component suppressor is configured to identify a direction of a noise source which is present in an output direction of the plurality of loudspeakers based on the noise component included in the picked-up sound signal, and suppresses the noise component if the direction of the noise source is identical to the relative direction indicated by the directional characteristic information.

11. The apparatus of claim 1, wherein
the signal processor further comprises an echo component suppressor configured to estimate an acoustic characteristic of an echo component included in the picked-up sound signal, and determine a gain according to the estimated acoustic characteristic to suppress the echo component, and
the echo component suppressor is configured to change an efficiency characteristic to estimate the acoustic characteristic based on the relative direction indicated by the directional characteristic information.

12. The apparatus of claim 11, wherein the echo suppressor is configured to suppress the echo component if the relative direction indicated by the directional characteristic information is identical to a predetermined direction.

13. The apparatus of claim 11, wherein the echo component suppressor is configured to generate a monaural signal from the picked-up sound signals of the plurality of channels based on the relative direction indicated by the directional characteristic information.

14. A signal processing method performed by a signal processor comprising a plurality of loudspeakers reproducing sound of a plurality of channels and a plurality of microphones picking up sound of a plurality of channels, the method comprising:
- detecting, by a detector, a user who is present in a direction of a space from which the plurality of microphones pickup the sound to output directional characteristic information indicating a relative direction of the user to the plurality of loudspeakers; and
- switching, by a signal processor, contents of processing to reduce a disturbance signal included in a picked-up sound signal of the sound picked up by the plurality of microphones from the picked-up sound signal based on the relative direction indicated by the directional characteristic information.

\* \* \* \* \*